C. B. SCHOENMEHL.
PRIMARY BATTERY.
APPLICATION FILED MAY 22, 1917.
1,322,353.
Patented Nov. 18, 1919.
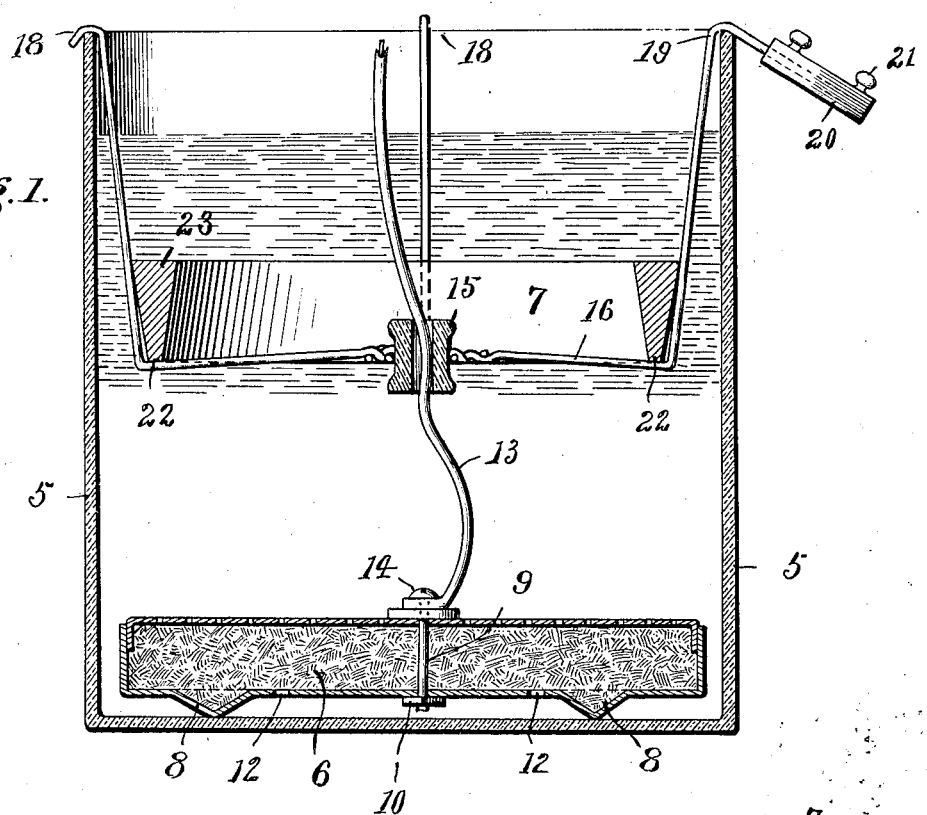
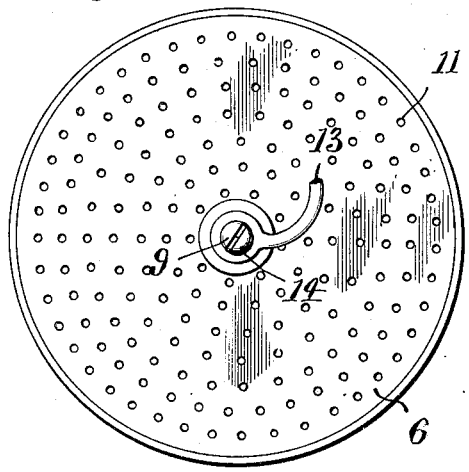
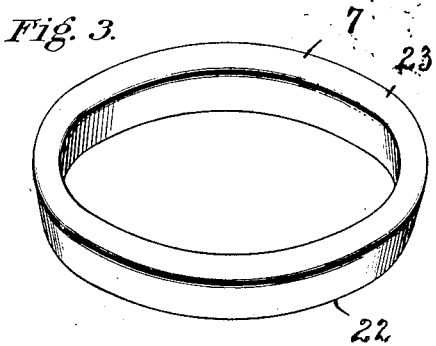
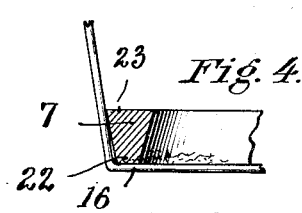
Inventor
Charles B. Schoenmehl
By Chamberlain & Newman
Attorneys

UNITED STATES PATENT OFFICE.

CHARLES B. SCHOENMEHL, OF WATERBURY, CONNECTICUT, ASSIGNOR TO WATERBURY BATTERY COMPANY, A CORPORATION OF CONNECTICUT.

PRIMARY BATTERY.

1,322,353.  Specification of Letters Patent.  Patented Nov. 18, 1919.

Application filed May 22, 1917. Serial No. 170,328.

*To all whom it may concern:*

Be it known that I, CHARLES B. SCHOENMEHL, a citizen of the United States, and resident of Waterbury, in the county of New Haven and State of Connecticut, have invented certain new and useful Improvements in Primary Batteries, of which the following is a specification.

This invention refers to high resistance railroad track circuit batteries, so called, such as are used for operating railway signals.

The purpose of the invention is to improve upon this form of battery by providing a special form of positive electrode, whereby the amount of the exposed working surface of the electrode, adjacent to the negative element, is automatically increased as the said positive electrode is eaten away by the action of the battery in a manner to maintain a uniform working efficiency of the cell; further to design the battery so as to form a simple and inexpensive construction requiring no cover and having but one special terminal wire.

The invention further resides and consists in the details of construction and formation and arrangement of parts as will be more fully described in the claim.

In the accompanying drawings forming a part of this specification similar characters of reference will be found to designate like or corresponding parts throughout the several figures, and of which, Figure 1 shows a cross sectional view through my improved form of battery complete.

Fig. 2 is a detached plan view of the negative element of said battery.

Fig. 3 is a detached perspective view of the positive element contained in the battery, and Fig. 4 is a detail cross sectional view taken through a part of the positive element and a part of its supporting frame said figure representing the element as in use.

Referring to the characters of reference marked upon the drawings 5 indicates a battery jar which may be of any preferred design adapted to support and contain the several elements comprising the battery. The negative electrode 6 is shown within the lower portion of the jar, while the positive electrode 7 is shown suspended in the upper portion. The action therefore between the two elements is what may be termed a vertical action, which may be regulated to some extent by varying the distance of one element from the other.

The negative element is in the form of a flat container which may be perforated in part or in whole by being made from sheet metal or woven wire as preferred and is preferably provided with two or more imperforated members 8—8 which are stamped down from the under side of the container to form feet or supports that rest on the bottom of the jar. This body portion of the container may be made separate from the top and assembled as shown in Fig. 1, the same being held together by a central binding screw 9 having a head upon one end and a nut 10 upon the other. The inside of the container is obviously filled with a depolarizing material such as oxid of metal. The top of the container as shown in this case includes a number of small holes 11, while the bottom portion is provided with a fewer number of holes 12, but larger in size. This permits of a free circulation and thorough saturization of the electrolyte therethrough and whereby there could be no air pockets formed in the container. The terminal wire 13 is preferably attached beneath the head 14 of the screw 9 that passes through the container and is passed through the porcelain spool 15 mounted within the wire support 16 for the positive element 7.

The support 16 for the positive element is preferably made of two pieces of suitably bent wire that are bent around the spool and twisted together and their end portions disposed out and upward to form two U-shaped hangers that cross each other, the end portions of which are bent out and downward to form hooks 18 to engage the top edge of the jar. One of these hooks 19 is made a bit longer than the others so that a coupling 20 having binding screws 21 may be detachably connected and whereby the field wire, not shown, may be connected to that side of the cell.

The positive element 7 which is formed of zinc is annular in form and may be made of either cast or rolled zinc as desired and of substantially the shape shown, which includes a relatively narrow lower edge portion 22 that rests upon the several arms of the wire support directly above and opposite to the face of the negative element. The two side walls and especially the inner wall of this element is tapered so that the upper portion 23 of the element is formed thicker than the lower. Therefore, as the lower exposed edge portion of the element disintegrates the element will settle upon the arms and gradually bring a wider surface in position for action, thereby increasing the relative amount of area that is available for attack.

This form of device obviously serves to maintain a uniform efficiency of the battery up to the last, whereas if the thickness of the positive element were uniform the efficiency of the battery would deteriorate in use.

Having thus described my invention, what I claim and desire to secure by Letters Patent is:—

In a primary battery of the class described the combination with the other parts, of a negative electrode, an annular form of zinc electrode having its upper edge wider than the lower edge and arranged above the negative electrode, means for supporting the positive electrode with its widest edge portion farthest from the negative electrode so that its narrow edge will be first consumed and its operative face automatically increased as the element is consumed.

Signed at Bridgeport in the county of Fairfield and State of Connecticut this 21 day of May A. D., 1917.

CHARLES B. SCHOENMEHL.

Witnesses:
C. M. NEWMAN,
RUTH M. W. KOGER.